(12) United States Patent
Krüger et al.

(10) Patent No.: US 12,030,079 B2
(45) Date of Patent: Jul. 9, 2024

(54) DEVICE AND METHOD FOR DEPOSITING LIQUID ON CARRIERS

(71) Applicant: LPKF Laser & Electronics AG, Garbsen (DE)

(72) Inventors: Robin A. Krüger, Hannover (DE); Jan van Aalst, Barsinghausen (DE); Moritz Woller, Hannover (DE)

(73) Assignee: LPKF Laser & Electronics AG, Garbsen (DE)

( * ) Notice: Subject to any disclaimer, the term of this patent is extended or adjusted under 35 U.S.C. 154(b) by 139 days.

(21) Appl. No.: 17/691,390

(22) Filed: Mar. 10, 2022

(65) Prior Publication Data
US 2022/0288626 A1    Sep. 15, 2022

(30) Foreign Application Priority Data

Mar. 15, 2021    (DE) .......................... 102021202518.8

(51) Int. Cl.
*B05C 11/10*    (2006.01)
*B05C 5/00*    (2006.01)

(52) U.S. Cl.
CPC .......... *B05C 11/1034* (2013.01); *B05C 5/002* (2013.01)

(58) Field of Classification Search
CPC ................ B05C 11/1034; B05C 5/002; G01N 2035/1034; G01N 35/1011
USPC ....................................................... 222/420
See application file for complete search history.

(56) References Cited

U.S. PATENT DOCUMENTS

| 8,834,793 | B2 * | 9/2014 | Koltay | G01N 15/1404 |
| | | | | 347/68 |
| 9,555,431 | B2 * | 1/2017 | Yamaguchi | B05B 17/00 |
| 2017/0241889 | A1 * | 8/2017 | Otsuka | G01N 15/1459 |
| 2017/0274689 | A1 * | 9/2017 | Rodriguez | C12Q 3/00 |
| 2019/0025185 | A1 * | 1/2019 | Katoh | G01N 15/1459 |
| 2019/0315139 | A1 * | 10/2019 | Yamamoto | B41J 2/2142 |

FOREIGN PATENT DOCUMENTS

| DE | 102015000920 A1 | 7/2016 |
| DE | 102015202547 A1 | 8/2016 |
| DE | 102015202574 A1 | 8/2016 |
| EP | 2577254 B1 | 2/2015 |
| EP | 2546656 B1 | 4/2019 |
| WO | 2007102785 A1 | 9/2007 |
| WO | 2010004627 A1 | 1/2010 |

OTHER PUBLICATIONS

Gross, et al., "Single-Cell Printer: Automated, On Demand, and Label Free", Journal of Laboratory Automation, 2013, vol. 18(6), pp. 504-518.
International Search Report from the corresponding International Patent Application No. PCT/EP2022/055182, dated Jun. 16, 2022.

* cited by examiner

*Primary Examiner* — Vishal Pancholi
(74) *Attorney, Agent, or Firm* — Greer, Burns & Crain, Ltd.; Steven P. Fallon

(57) ABSTRACT

A device for depositing liquid droplets onto a carrier includes a droplet generator and a holding device for the carrier, and a detector arranged to detect a signal for each liquid section or droplet, and a transport device for moving the holding device relative to the droplet generator and preferably a memory connected to the detector.

27 Claims, 1 Drawing Sheet

DEVICE AND METHOD FOR DEPOSITING LIQUID ON CARRIERS

PRIORITY CLAIM

The present invention claims priority under 35 U.S.C. § 119 from German patent application 10 2021 202 518.8, filed on 15 Mar. 2021.

FIELD OF THE INVENTION

A field of the invention is liquid deposition on carriers.

BACKGROUND

EP 2 546 656 B1 describes a droplet ejection device having an optical detector aimed at a monitoring section of the device containing a liquid to be ejected, with a control device that changes the state of particles in the monitoring section by controlling an actuator for ejection.

EP 2 577 254 B1 describes a device for droplet deposition, which is driven by a piezo for the generation of droplets from a liquid, which is controlled depending on the detection of the liquid in a channel section. Droplets ejected from the channel are directed in a controlled manner to one of two positions.

DE 10 2015 000 920 A1 describes the control of an actuator, which is coupled to a dispensing unit, with two cameras, which are to provide coordinates for the control of the actuator, for the depositing of droplets.

DE 10 2015 202 574 A1 describes a nozzle for the targeted dispensing of droplets, in which a controlled sound generator can apply targeted vibrations to liquid in order to dispense individual droplets.

WO 2007/102785 A1 describes a carrier with through-holes that have a taper for holding liquid droplets.

WO 2010/004627 A1 describes that for settling individual volumes, a liquid in a capillary can be irradiated with light and then deposited settled through a nozzle, the deposited volume being controlled depending on the concentration of particles.

The aforementioned devices have the disadvantage of a low depositing rate of droplets on a carrier.

SUMMARY OF THE INVENTION

A device for depositing liquid droplets on a carrier includes
  a droplet generator arranged to generate droplets from a liquid,
  a holding device, configured for receiving a carrier,
  at least one detector arranged to detect a signal for each liquid section from which the droplet generator forms a droplet and/or to detect a signal for each droplet generated, wherein the at least one detector is connected to a memory configured to assign and store signals picked up by the at least one detector to the regions to which the droplet generator is directed,
  wherein the droplet generator is arranged to generate droplets independently of signals from the detector, and
a transport device configured to move the holding device or the droplet generator.

BRIEF DESCRIPTION OF THE DRAWINGS

Preferred embodiments are described in more detail by an example and with reference to the figures, which schematically show in FIG. 1 a device according to the invention and
FIG. 2 an embodiment of the device.

DETAILED DESCRIPTION OF THE PREFERRED EMBODIMENTS

Figure 1:
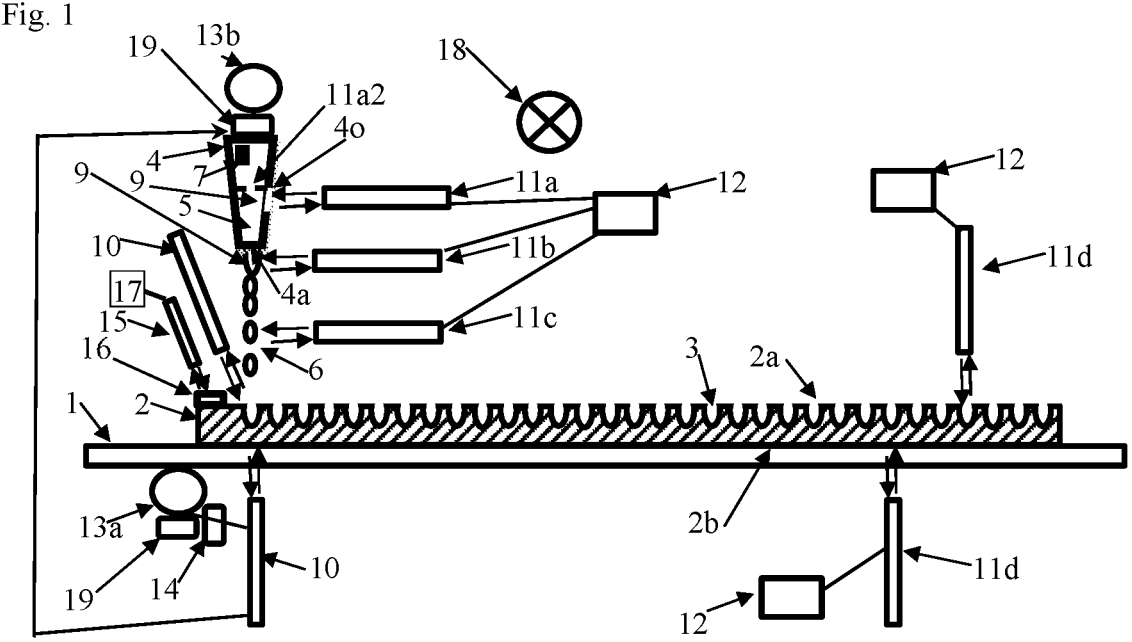

The invention has the object of providing an alternative device and an alternative method for depositing droplets on a carrier in order to allow faster deposition of droplets. Preferably, the device and method are arranged such that the measured values for the particles contained in the droplets are associated with the droplets.

The present invention relates to a device and a method for depositing liquid onto a carrier, and to the use of the device as a dispensing device of liquid onto a carrier. The liquid preferably contains at least one substance, which is preferably at least one type of particles or a mixture of at least two types of particles, which are in particular biological cells. The particles, in particular biological cells, are suspended in the liquid, preferably in the form of isolated cells. Biological cells can be those of microorganisms, e.g. bacteria, yeast or fungi, plant or animal cells, in particular human cells, in each case originating from a culture or biological sample, e.g. a blood sample or from tissue.

The device and the method which can be carried out with it have the advantage of depositing droplets of the liquid on a carrier at high speed, each droplet being assigned the measured value of at least one detection, so that each droplet is assigned its content of substance or particles or some other property as a measured value. Preferably, the carrier comprises wells and the device is configured to deposit the droplets, preferably individual droplets or a predetermined number of droplets in each case, into individual wells.

A device for depositing liquid droplets on a carrier is provided, having
  a droplet generator configured to generate droplets from a liquid, and a holding device adapted to receive a carrier,
  at least one detector configured to detect a signal for each liquid section from which the droplet generator forms a droplet and/or to detect a signal for each generated droplet and/or deposited drop, e.g. is configured to detect a substance contained in drops, which preferably has a particle or is a particle, the at least one detector preferably being connected to a memory configured to assign signals received by the at least one detector to the regions relative to the holding device in which droplets produced from liquid sections are deposited and/or arranged on the carrier, the regions being, for example, surface regions of a carrier which are spaced apart from one another, in particular wells formed in a carrier,
  and optionally a memory, preferably an electronic memory, configured to assign signals of the at least one detector to the regions relative to the holding device in which the respective liquid sections or droplets are arranged on a carrier,
  wherein the droplet generator is preferably configured to generate droplets independently of the detection,
  wherein the droplet generator is preferably configured for the exclusively continuous generation of drops,
  a transport device for relative movement of the holding device to the droplet generator, preferably for relative movement with a distance between the holding device and the droplet generator, wherein the transport device is configured to move the holding device or to move the droplet generator, and wherein the movement of the transport device is optionally controlled solely as a function of the rate of droplet generation and/or as a function of the input of data for the arrangement of wells of a carrier to be arranged on the holding device, optionally a control device connected to the transport device, configured to detect the relative position of the holding device to the droplet generator, in particular the relative position of a carrier arranged on the holding device to the droplet generator, and to control the transport device, wherein optionally the control device has a position detector directed at the holding device, which position detector is configured to detect the relative position of the holding device to the droplet generator and to control the position of the transport device depending on the detection, wherein the transport device is configured in particular to move the holding device or the droplet generator in a controlled manner in order to position successively regions, which are spaced apart and in which wells of a carrier to be arranged on the holding device are preferably arranged, in a manner matching the droplet generator, wherein optionally, in particular in addition to a memory connected to the detector or without a memory connected to the detector, the droplet generator is controlled in dependence on the at least one detector and the transport device, in particular a control device connected thereto, is configured to move the holding device or the droplet generator only when at least one, preferably precisely one predetermined signal is detected by the detector, or consisting thereof.

The device is configured so that each individual droplet or a plurality of droplets are deposited individually on regions of a carrier, preferably each in an individual well of a carrier. The device and method are configured such that the measured values for the substance contained in the droplets are assigned to the droplets and their arrangement on a carrier, and this assignment is preferably stored in a memory. Generally, the device may be configured for the transport means to move the holding means or the droplet generator at least twice to align at least a portion of the wells or all wells of the carrier to match the droplet generator at least twice and to deposit at least one further droplet of the same liquid into the portion of the wells or into all wells.

In general, the droplet generator can generate single or a plurality of droplets by any process. Without claiming to be exhaustive, generation can take place electromechanically, piezoelectrically, by mechanical deflection, pneumatically, thermally by vapor formation, by thermal expansion, by electrostatic repulsion or attraction, acoustically, optically and/or by means of valves.

In general, the transport device is configured for a relative movement of the holding device, on which a carrier is to be arranged, to the droplet generator. Therein, the transport device can be configured for movement of the holding device and the droplet generator can be stationary, and/or the holding device can be stationary and the transport device can be configured for movement of the droplet generator. Alternatively, both the holding device and the droplet generator may be arranged on a transport device for movement relative to each other.

In general, the device can be configured to deposit at least one droplet of at least one second liquid at each region of the holding device or of the carrier arranged thereon, at which at least one droplet is deposited, before and/or after the deposition of drops. Therein the second liquid has a different composition than the particle-containing liquid. The second liquid may be, for example, a cultivation medium for cells, a liquid containing a reagent, a liquid containing a dye, a liquid containing one biomolecule or several different biomolecules. Therein, the device may be configured to first deposit droplets of a second liquid onto regions, in particular wells, of a support, to subsequently deposit droplets of the liquid containing particles, and optionally subsequently to deposit droplets of a third liquid onto the same regions. The third liquid may have the same composition as the second liquid or a different composition. In general, the device may be configured to deposit a second liquid and/or third liquid independently into the same predetermined areas, in particular predetermined wells of a carrier, in the form of drops, and not to deposit a second liquid and/or third liquid in the form of droplets into remaining areas, in particular wells. Therein, the device may be configured to control each of the droplet generators with different frequency for droplet generation and/or different pressurization. This is not limited to two or three liquids, but can be applied to any number of liquids.

In embodiments in which the device is configured to deposit a second and/or a third liquid in addition to a particle-containing liquid into the same predetermined areas, in particular wells, in the form of droplets, it preferably has in each case at least one separate second droplet generator for the second liquid and optionally a separate third droplet generator for the third liquid. Optionally, the device may comprise further droplet generators. All droplet generators, for example a second and/or a third droplet generator, may be spaced apart from each other, for example fixed at a distance from the droplet generator for the particle-containing liquid, and optionally guided movably only together by the transport device or all may be stationary. Alternatively, the device can be configured so that a second droplet generator and, further optionally, a third droplet generator are moved at the same or in each case different speeds relative to the holding device or to the carrier arranged thereon, are controlled for in each case the same or in each case different frequencies of droplet generation, and/or are acted upon in each case with the same or different pressure.

In this regard, the device may further optionally be configured to deposit a predetermined number of droplets in each area of the holding device or of a carrier arranged thereon, in particular in each well, wherein the number is predetermined, for example, as the total volume of this number of droplets containing on average at least or exactly one particle. In this embodiment, the device may also be without a memory associated with the detector. Optionally, in this embodiment, the device may be without a detector, such that the device is arranged to deposit the predetermined number of droplets onto spaced regions of a holding device or onto spaced regions of a carrier disposed on the holding device, without having a detector and without a memory connected to the detector.

In each embodiment, the device is configured to deposit droplets at a high rate onto a carrier, in particular onto spaced areas of a carrier, or into wells of a carrier, while the holding device on which the carrier is arranged and/or the droplet generator is moved by means of a transport device, in particular relative to the positioning of the wells to the droplet generator. Due to the device being configured to deposit all droplets on a carrier, in particular in its wells, the movement of the nozzle along the carrier is omitted, which movement is controlled depending on the detection of particles in the liquid, so that the device allows a fast depositing of droplets on the carrier, in particular in wells of the carrier arranged on the holding device. Due to the transport device being controlled solely depending on the rate of droplet generation and/or optionally additionally for depositing a predetermined number of droplets per region, the relative movement of holding device and/or carrier arranged thereon to the droplet generator is preferably independent of the result of the detection of a signal for each liquid section from which the droplet generator forms a droplet and/or a signal for each generated drop. Especially preferred, the transport device is controlled independently of the detection of substance in droplets. In the method, in the liquid to be separated into droplets and deposited on the carrier, the concentration of particles can be adjusted so that per volume of a droplet to be generated or per predetermined number of droplets, statistically a predetermined number of particles, e.g., at most exactly 1 particle, e.g., statistically 0.2 to 0.9 particles, or exactly 2, 3, 4 or more particles are contained.

The at least one detector, configured for detection of a signal for each liquid section from which the droplet generator forms a droplet and/or which is arranged for detection of a signal for each generated droplet, is preferably directed to at least one region in which a liquid section of a continuous liquid phase is arranged from which the droplet generator generates a droplet, e.g. a region in the internal volume, e.g. a conduit portion, of the droplet generator, or which is a continuous liquid section formed directly at the droplet generator, or which is a region arranged at a distance from the droplet generator in which droplets are formed from a liquid, and/or which is a region in which droplets are arranged on a carrier arranged on the holding device, e.g. on spaced surface regions of a carrier or droplets arranged in wells of a carrier. In general, the signal may be specific to a substance contained in the liquid, which is in particular a particle, e.g. cell or synthetic particle of plastic, metal, ceramic or glass, and/or an added labeling reagent.

A detector may be a photoelectric cell, a photoamplifier tube, a digital photosensor, e.g. a digital camera, optionally with preceding optics, e.g. microscope optics. The electronic memory may comprise a digital image processing unit, optionally coupled to the detector directly or by data transfer means. Accordingly, the signal detected by the detector may be the intensity of a particular wavelength, e.g. a wavelength at which a labeling reagent bound to a particle fluoresces or at which particles absorb or scatter light. The signal detected by the detector may be a microscopic image, e.g., bright field or phase contrast or fluorescence image or dark field. The microscopic image may contain multiple wells simultaneously. The microscopic image may be composed of multiple images to provide a 3D image of the contents of the wells. A detector for capturing microscopic images may be located below the carrier and used to image the contents of the wells after conducting the method of the invention, preferably in comparison with or as a difference image with a microscopic image captured from the carrier prior conducting the method.

The arrangement and alignment of a detector on liquid in a liquid section in which the liquid forms a continuous phase, which is in particular a region inside the droplet generator or downstream of its outlet opening in a region of continuous liquid, has the advantage that the detector is directed to a quasi-stationary region of flowing liquid. In particular, in this embodiment, the detector may be a conductivity sensor. When a detector is directed to a region within the droplet generator, e.g. by its optically transparent wall regions, there is the advantage that the refraction of excitation radiation irradiated into the droplet generator can be adjusted by means of the wall regions.

In embodiments in which the device is controlled in addition to a memory connected to the detector or without a memory connected to the detector, the droplet generator is controlled in dependence on the at least one detector, the transport device, in particular a control device connected thereto, may be configured to move the droplet generator relative to the holding device or to move the holding device relative to the droplet generator only when at least one, preferably exactly one predetermined signal is detected, indicating, for example, the presence of a particle, in particular a cell, in a drop. Such a predetermined signal may be, for example, the presence of at least one particle that is a cell or a synthetic particle, the presence or absence of a labeling reagent, or a labeled specific binding molecule, e.g. a labeled antibody or labeled DNA or RNA molecule, a labeled cell wall, or dye for color labeling of cell organelles or the cytosol. In these embodiments, the device may optionally be without a memory adapted to store signals from the at least one detector.

In the embodiment in which a detector is directed to an area in which droplets are arranged on a carrier arranged on the holding device, e.g. droplets arranged on spaced surface regions of a planar carrier or in wells of a carrier, the detector may be directed to the holding device or to the carrier arranged thereon independently of the droplet generator. Therein, a detector may be directed toward the holding device or toward a carrier disposed on a holding device from the direction from which the droplet generator has deposited liquid. For example, the detector may be directed towards a holding device in a direction in which the detector is directed towards the side of a carrier arranged on the holding device from which wells extend into the carrier, or towards the open cross-sections of the wells. This has the advantage that droplets deposited in wells of the carrier can be detected by the detector directly or without interference by material of the carrier. For excitation of radiation emitted by droplets or substances contained therein, the device may comprise an excitation light source directed at the holding device or at a carrier arranged thereon. An excitation light source may be directed onto the holding device or onto a carrier arranged thereon from the same side as the detector, or from the side opposite the detector.

The device may have one detector or at least two or three detectors aimed at one of these areas.

Optionally, the at least one detector and the preferably electronic memory connected to it are configured to assign the signals of the at least one detector to the position of the holding device relative to the droplet generator, in particular to assign the signals of the at least one detector to the position of wells that are arranged on the holding device. This assignment can be made with respect to a reference point mounted on the carrier.

The at least one detector may be an optical detector, preferably in combination with a light source arranged to irradiate the area to which the detector is directed. Alternatively, a detector may be a conductivity sensor that is configured to measure changes in conductivity in the presence of a particle, e.g., when a particle-containing liquid passes through a section of the droplet generator. Generally preferred, a detector is configured to determine the presence of a particle and/or the presence of a labeling reagent added to the fluid, which may be, for example, a labeled specific binding molecule, e.g. a labeled antibody or a labeled DNA or RNA molecule, a labeled cell wall, or dye for color labeling of cell organelles or the cytosol, wherein, irrespective of the binding molecule or labeling region, the label may generally be, e.g., a nanoparticle, a dye, or a functional group, or the labeling reagent may consist of a label.

The detector can be configured to detect the arrangement of droplets on the carrier and preferably to store the detected arrangement of droplets on the carrier in a memory, further preferably additionally signals associated with the droplets for the presence of a substance contained in droplets. Therein, the transport device may be arranged to move the droplet generator or the holding device independently of the carrier and of the arrangement of wells on the carrier. In this embodiment, the droplet generator is arranged to deposit one or more droplets on the carrier independently of the carrier or of wells, and the detector is arranged to detect the position of the droplet deposited on the carrier or the arrangement of droplets deposited on the carrier, to associate this detected position or arrangement with a reference point of the carrier, and to store this data in a memory, preferably additionally signals associated with the droplets for the presence of a substance contained in drops. The substance can be used for easier identification of these droplets, e.g. in the form of a marking reagent, in particular a dyeing reagent.

In general, each carrier may have a reference point, such as a code. Generally, the reference point can be located on the carrier, on the holding device, or at any location.

The position detector of the control device can be directed towards a region of the holding device opposite the droplet generator or towards a region of the holding device facing the droplet generator. In general, it is preferred that the control device is configured to determine the position of wells of a carrier arranged on the holding device and to control the transport device, e.g. to control that wells for receiving droplets are positioned to match the droplet generator or a droplet generator is positioned to match wells, in particular to be positioned only depending on the frequency of the droplet generation.

The optional position detector can be configured to record the position of the holding device, preferably of a carrier arranged thereon relative to the droplet generator, during the duration of the movement of the transport device continuously, at an interval or at at least two temporally spaced intervals, or only at the start of the operation of the droplet generator and/or only at the start of the movement and/or at the end of the movement of the transport device. An interval can be one or more temporally spaced fixed temporal sections of the movement of the transport device and/or the operation of the droplet generator, or a number of wells positioned matchingly to the droplet generator.

The transport device can have a correction drive, e.g. piezo actuators, which is controlled by the position detector. Therein, the movement of the transport device, in particular by means of a correction drive, can be an acceleration or deceleration of the movement of the transport device and/or a movement orthogonal to the movement of the transport device, optionally parallel or orthogonal to the plane of the holding device or to the surface of a carrier to be placed thereon. In this case, the correction drive acts on the transport device to control the movement of the holding device or of the droplet generator depending on the position detector. A correction drive may be mounted between the transport device and the holding device or droplet generator driven thereby for movement. Alternatively, the transport device may be arranged to move one of the holding device and the droplet generator, and the correction drive may be arranged to move the other of the holding device and the droplet generator that is not moved by the transport device.

The movement of the transport device can be controlled in particular in dependence on the position detector, e.g. when the position detector is configured to continuously detect the relative position of the holding device or a carrier arranged thereon with respect to the droplet generator. The transport device can be controlled to move the holding device or the droplet generator depending on the position detector.

Optionally, the device has at least two droplet generators that are arranged at a distance from one another that is, for example, perpendicular or parallel to the direction of movement of the transport device.

Preferably, the droplet generator is arranged at a distance from the holding device by which the droplet generator is spaced from the holding device when a carrier is arranged on the holding device, so that liquid emerging from the droplet generator crosses the distance between the droplet generator and the carrier as free-falling drops. Alternatively, the droplet generator can be arranged at a distance from the holding device at which the droplet generator is spaced from the holding device when a carrier is arranged on the holding device such that liquid exiting the droplet generator contacts the carrier before the liquid loses contact with the droplet generator, e.g. at a distance equal to or smaller than the diameter of exiting liquid. The diameter of exiting liquid or droplets can be determined depending on parameters such as surface tension, viscosity, temperature, pressure level in the droplet generator, size of the outlet opening, frequency and amplitude of the droplet generating energy input of the droplet generator.

The droplet generator can be a conduit with an outlet or a nozzle for generating drops, optionally with a transparent area to which an optical detector is directed. The droplet generator is connected to a source of the liquid from which droplets are to be generated. In this case, the source may be pressurized or a pump may be arranged in the conduit between the source and the droplet generator. For the generation of droplets, the droplet generator may comprise a vibration generator, e.g. a piezoelectric crystal to which electrical voltage pulses may be applied in a controlled manner. The oscillator is arranged to apply frequency, also referred to as rate, and amplitude of the droplet-generating energy input to the fluid flow in the droplet generator.

Optionally, at least two droplet generators are connected to a source of liquid, the droplet generators being directed towards a holding device and being arranged to simultaneously deposit droplets of the liquid onto exactly one carrier, in particular into its wells.

The holding device on which the carrier is to be arranged can be movable by the transport device and/or the correction drive in a controlled manner in at least one direction, preferably in one plane, e.g. an XY table, or can be movable in three dimensions, e.g. an XYZ table.

Preferably, the carrier comprises or consists of a single-piece or multi-piece sheet of glass and/or silicon and/or plastic and/or metal and optionally has wells in a regular or irregular arrangement or has or consists of a flat surface onto which droplets can be deposited in spaced areas. Preferably, the wells have only one cross-sectional opening; alternatively, the wells may be through-holes extending through the full thickness of the carrier and have a cross-section that retains droplets from the deposited liquid by capillary forces, e.g., a circular cross-section of 10 to 500 μm diameter. The wells may have a spacing of 5 μm to 500 μm or more. The wells may have a depth of 15 μm to 500 μm or more. The ratio of depth to diameter can preferably be between 1 and 50.

Optionally, the device can be configured to determine the number and/or sequence of droplets or arrangement of wells for which the absence of a signal from the detector for the presence of a substance, in particular a particle, has been detected and to assign it to the carrier as an identification pattern.

The transport device can have, for example, a reference switch and stepper motor for position determination and as drive, a mechanical stop and a controlled servo motor, or a controlled glass scale, e.g. with electro-optical scanning, with linear axis drive.

In general, the control device can be configured so that data for the arrangement of wells can be entered and the control device moves the transport device to position the droplet generator or the holding device according to the entered arrangement. Therein, the arrangement may be a regular arrangement, such as a grid of wells, or an irregular arrangement of wells. The device may have a sensor for inputting data for the arrangement of the wells, e.g., a microscope that captures the arrangement of the wells as an image as input for data, or an optical sensor that is arranged to detect an encoding of carriers, the encoding being, for example, a QR code on the carrier. Therein, the coding is coupled with data for the arrangement of the wells, wherein the data for this arrangement can be taken from a memory. Alternatively or additionally, the control unit can be configured to control the droplet generator, in particular its pressurization and/or its vibration generator, and/or the transport device depending on the entered arrangement of wells, in order to deposit droplets selectively into the wells of the arrangement.

The droplet generator can be configured, in particular independently of signals from the detector for the presence of a substance in drops, to generate a sequence of droplets in which at least two droplets are generated at a shorter time interval than a longer time interval to the subsequently generated drop. In this sequence of drops, the transport device is arranged to align the holding device and the droplet generator relative to one another so that a well of a carrier to be arranged on the holding device is positioned matchingly to the droplet generator in order to deposit the at least two droplets therein within the shorter time interval, and the transport device is arranged to move the holding device and the droplet generator relative to one another during the longer time interval to the subsequently generated droplet in order to position a further well matchingly to the droplet generator. Also in this embodiment, the droplet generator is preferably arranged to generate the sequence of droplets independently of the signal from a detector for the presence of a substance in drops. Alternatively, the droplet generator may be arranged to generate droplets at shorter time intervals until at least one signal for the presence of a substance in a droplet is detected and to generate the immediately following droplet at longer time intervals. The droplet generator, e.g. its oscillator or its pressurization, can be controlled depending on the signal from the detector for the presence of a substance.

In general, the device can be configured, following a first movement of the transport device for aligning each well of a carrier arranged on the holding device relative to the droplet generator, to position the droplet generator or the holding device again by means of the transport device exclusively with those wells matchingly to the droplet generator for which the absence of the predetermined number of particles, in particular the absence of particles, has been detected by the detector. In the process, the droplet generator can be moved depending on the signals picked up by the detector to match the wells for which the absence of the predetermined number of particles, in particular the absence of particles, has been detected.

Optionally, the device is adapted to abort the process upon detection of a predetermined signal by a detector, for example, upon detection of a signal indicating the absence of a carrier or wells to not allow liquid to escape when no carrier or a carrier is located in the wrong orientation on the holding device. A signal upon detection of which the process is aborted may be one indicating the absence of liquid in one of the droplet generators, a signal indicating a droplet frequency outside a predetermined range, or a signal indicating the presence of droplets outside wells of a carrier, e.g., a signal picked up by a detector or position sensor pointed at the carrier.

The method for depositing droplets on a carrier, which can be carried out using the device, has the advantage of depositing droplets at a high rate on a carrier arranged on the holding device, in particular depositing them into individual wells of a carrier, and assigning the signal of the at least one detector to the droplets or to the individual wells into which the droplets are deposited. The device generates an arrangement of drops, in particular of individual drops, on a carrier or in wells of a carrier, in each case with assignment of the signal of the detector to the droplets or to the wells. Therefore, identification of the wells containing exactly one or a predetermined number of droplets with a substance generating a detector signal or with a particle is easy. The rate of depositing individual droplets into respective individual wells may be, for example, 1 to 6000 Hz, for example, 20 to 200 Hz, for example, 40 to 60 Hz, and is preferably equal to the rate of generation of droplets. In general, the configured of the device or of parts thereof describes the corresponding steps of the method.

The transport device can be configured for relative movement at the same speed between the droplet generator and the holding device when a well is positioned to match the droplet generator and also when no well is positioned to match the droplet generator. In general, it is preferred that the transport device is configured for continuous movement at a constant speed and that during this movement the droplet generator is controlled to continuously generate and respectively, deposit droplets. Therein, the droplet generator can be configured to deposit a predetermined number of droplets into wells at a higher rate when positioned matchingly to wells than when positioned next to a well, e.g. to deposit droplets at a higher rate into matchingly positioned wells than when the droplet generator is not matchingly positioned, in particular when positioned next to wells.

Generally, the setup of the device and the setup of its elements also describes the method, and the method also describes the setup of the device and of its elements to the method steps.

The method comprises or consists of the steps of
by means of a droplet generator, generating droplets from a liquid containing at least one substance, which are preferably particles, and depositing droplets on a carrier, preferably depositing individual droplets in respective individual wells of a carrier or on spaced regions of a plane surface of a carrier, while the carrier is arranged on a holding device, detecting a signal for each liquid section from which a droplet is formed and/or detecting a signal for each droplet by means of at least one detector, and/or detecting a signal for each well by means of a detector, the signals indicating the presence or absence of the substance, and preferably assigning the signals to regions of the carrier on which droplets are deposited, preferably assigning the signals to the wells of a carrier into which individual droplets have been deposited, and storing the signals with assignment to the regions of the carrier or assignment of the signals to the wells of a carrier in a memory, which may be an electronic memory, moving the carrier by means of a transport device at a distance from the droplet generator relative to the droplet generator, preferably detecting, preferably by means of a position detector, the relative position of the carrier to the droplet generator and, by means of a transport device controlled by a control device, positioning or moving the carrier in order to position successively spaced surface regions, in particular wells, of the carrier to match the droplet generator, in particular positioning in each case a separate well for each individual droplet or for a predetermined number of drops, matchingly to the droplet generator, preferably detecting the position of the carrier by means of a correction drive that is controlled in dependence on a position detector, and positioning the carrier relative to the droplet generator, wherein the transport device moves one of the holding device or carrier and droplet generator and the correction drive moves the other of the holding device or carrier and droplet generator, which is not moved by the transport device, or the correction drive is connected to the transport device.

The at least one detector may be directed at a section of liquid from which a droplet is subsequently formed, for example, a continuous section of liquid within the droplet generator or within a conduit section upstream of the outlet opening thereof or immediately adjacent to the outlet opening of the droplet generator. Alternatively or additionally, the at least one detector can be directed to an area which is located at a distance from the droplet generator and in which separate drops, in particular as a free flow of drops, are present and respectively are moving towards the carrier. This embodiment has the advantage that the time interval between the detection and the deposition of the droplets on the carrier is shorter than in the case of detection of sections of the continuous liquid stream within or directly adjacent to the droplet generator.

Alternatively or additionally, the at least one detector may be directed to an area where the carrier is placed on the transport device, or the detector may be directed to the carrier, e.g. to its upper side, from which wells extend into the carrier, or from the opposite lower side, which is opposite to the side on which droplets have been deposited. Therein, a detector directed to the carrier allows the detection and assignment of the detected signals with temporal and spatial distance from the deposition of the droplets on the carrier and, in particular, the detection and assignment of the detected signals without temporal distance between the detection of droplets and the deposition of the droplets on the carrier, so that the correctness of the assignment is increased, e.g., compared to the detection in the continuous liquid flow or in the free droplet flow. A detector directed to the area where the upper side of a carrier placed thereon is located may be connected to the droplet generator at a fixed distance, and directed to the holding device or to a carrier thereon, and further optionally movable in parallel with the droplet generator by means of the transport device.

In an embodiment, the detector can control that the transport device does not move the carrier relative to the droplet generator until the detector detects a signal for at least one or exactly one particle or for a predetermined number of particles, e.g. for a labeling reagent, so that droplets are deposited on a region, in particular in a well, of a carrier until the detector detects such a signal.

In this case, the transport device may be controlled by means of the control device in dependence on the detector for positioning the holding device relative to the droplet generator. Also in this embodiment, the device is preferably arranged to control the transport device in dependence on the input of data for the arrangement of wells of a carrier to be arranged on the holding device and to arrange the wells of this arrangement in immediate succession to match the droplet generator. In this embodiment, the method can optionally proceed without a step of storing signals of the detector and/or without a step of assigning signals of the detector to the positioning of the carrier or respectively of the transport device.

In general, it can be provided that data for the arrangement of wells can be entered into the control device and the control device moves the transport device for positioning the droplet generator or the holding device according to the entered arrangement. Therein, the arrangement can be a regular arrangement, e.g. a grid of the wells, or an irregular arrangement of the wells. Data for the arrangement of the wells can be entered via a sensor, wherein the sensor is, for example, a microscope that captures the arrangement of the wells as an image as input for data, or an optical sensor that is configured to detect a coding of carriers, wherein the coding is, for example, a QR code on the carrier. Therein, the coding is coupled with data for the arrangement of the wells and the data for this arrangement can be taken from a memory. Alternatively or additionally, the control unit can control the droplet generator, in particular its pressurization and/or its vibration generator, and/or the transport device depending on the entered arrangement of wells in order to deposit droplets selectively into the wells of the arrangement.

In an alternative embodiment, the method is carried out without detection of the liquid, but the number of droplets comprising a volume containing on statistical average a certain number of particles, e.g. at least or exactly 1, 2, 3, 4, 5, 6 or more particles, is predetermined. The number of droplets for a volume comprising a predetermined number of particles can be predetermined from the concentration of particles in the liquid.

Optionally, the method may provide that at least one droplet of at least one second liquid is deposited at each region of the carrier where at least one droplet is deposited, before and/or after the deposition of drops. The second liquid has a different composition than the particle-containing liquid. The second liquid may be, for example, a cultivation medium for cells, a liquid containing a reagent, a liquid containing a dye, a liquid containing one or more different biomolecules. In the process, droplets of a second liquid may first be deposited on regions, in particular on wells, of a support, followed by droplets of the liquid containing particles, and optionally followed by droplets of a third liquid. The third liquid may have the same composition as the second liquid, or a different composition.

Further optionally, the transport device can be controlled to align a portion of the wells of a carrier matchingly to at least one droplet generator until droplets are deposited in this portion of the wells, while another portion of the wells of the carrier is not aligned matchingly to the droplet generator and no droplets are deposited in these. Further optionally, the carrier may have wells of different sizes, the data on the arrangement of the wells may also include data on the different sizes of the wells, and the transport device may be controlled depending thereon. Therein, the transport device can be controlled to align wells depending on their size to match the droplet generator until a number of droplets dependent on the size of the well is deposited and/or additionally to matchingly align a second and/or third droplet generator until a number of droplets dependent on the well size is deposited.

Further, the droplet generator can be controlled to generate droplets at a different frequency depending on the size of the wells.

Optionally, the position detection can be used to interrupt or abort the process during execution in case of excessive deviations from a target position determined by the position of the wells.

FIG. 1 as a holding device 1 shows an XY table which can be moved in the horizontal XY plane in a controlled manner. A carrier 2, e.g. made of plastic or glass or silicon or metal, is arranged on the XY table, which has wells 3 as spaced surface regions, e.g. wells 3 arranged in rows and/or lines, which extend from only one side, referred to here as the upper side 2a, as recesses into the carrier 2. A droplet generator 4 in the form of a nozzle is arranged at a distance from the XY table, so that when the carrier 2 is arranged on the XY table, the nozzle as the droplet generator 4 is spaced such that a free droplet stream 6 is formed from the liquid 5 emerging from the nozzle, or that liquid 5 emerging from the nozzle already comes into contact with the carrier 2 while it is still in contact with the nozzle. The droplet generator 4 in the form of the nozzle has an optional vibration generator 7, for example a piezoelectric crystal to which voltage pulses can be applied. A position detector 10 is directed towards the holding device 1, respectively on the XY table 1, in particular towards the upper side 2a of the carrier 2 facing the nozzle 4 or towards the lower side 2b of the carrier 2 opposite the nozzle 4, in order to detect the position of the wells 3 and to position the wells 3 matchingly to the droplet generator 4. The holding device 1 is movable by means of a transport device 13a and controlled by means of a control device 14 depending on the signal of the position detector 10, which records the position of the wells 3 in the carrier 2. Alternatively or in addition to a transport device 13a which moves the holding device 1, the device has a transport device 13b which is arranged for controlled movement of the droplet generator 4 along the holding device 1. For entering data for the arrangement of wells 3 of a carrier 2 to be arranged on the holding device 1, the device has a sensor 15 which is arranged to detect the arrangement of the wells 3 or to detect a coding 16 of a carrier 2 arranged on the holding device 1. The coding 16 is connected, for example, to a memory 17 which contains data associated with the coding 16 relating to the arrangement of wells 3 of a carrier 2. A light source 18 is directed onto the holding device 1 for illuminating the carrier 2 and possibly a coding 16 attached thereto.

The at least one detector 11a can be directed at a liquid section 9 within the droplet generator 4. In this case, the detector 11a2 may be formed as a passage with a conductivity sensor in the inner volume of the nozzle 4 and be configured to determine a change in conductivity as a signal when a particle passes through. Alternatively, the detector 11a may be an optical detector directed through an optically transmissive wall section 4o of the nozzle 4 to the inner volume thereof, optionally with an excitation light source directed to the same liquid section 9 or respectively to the same inner volume.

Additionally or alternatively, the at least one detector 11b may be directed to a region immediately adjacent to the outlet opening 4a of the nozzle 4 where a continuous flow of liquid 5 exits, or the detector 11c may be directed to a region downstream of the outlet opening 4a of the nozzle 4 where a free flow of droplets 6 is formed.

Additionally or alternatively, the at least one detector 11d may be directed at the support 2 or at the wells 3, from the upper side 2a and/or from the lower side 2b of the support 2. In general, each detector may have a source of illumination and/or excitation radiation or excitation light directed at the region to be detected. In general, for the detectors 11a, 11b, 11c, 11d, 11a2, in the Figure, irradiated excitation radiation and detectable radiation that can be picked up by the detector and processed into a signal are shown as oppositely directed parallel arrows.

FIG. 1 shows a correction drive 19, once mounted between the transport device 13a and the holding device 1 driven thereby for movement, and as an alternative once mounted between the transport device 13b and the droplet generator 4 driven thereby for movement. The correction drive 19 is controlled depending on the position detector 10.

Figure 2:
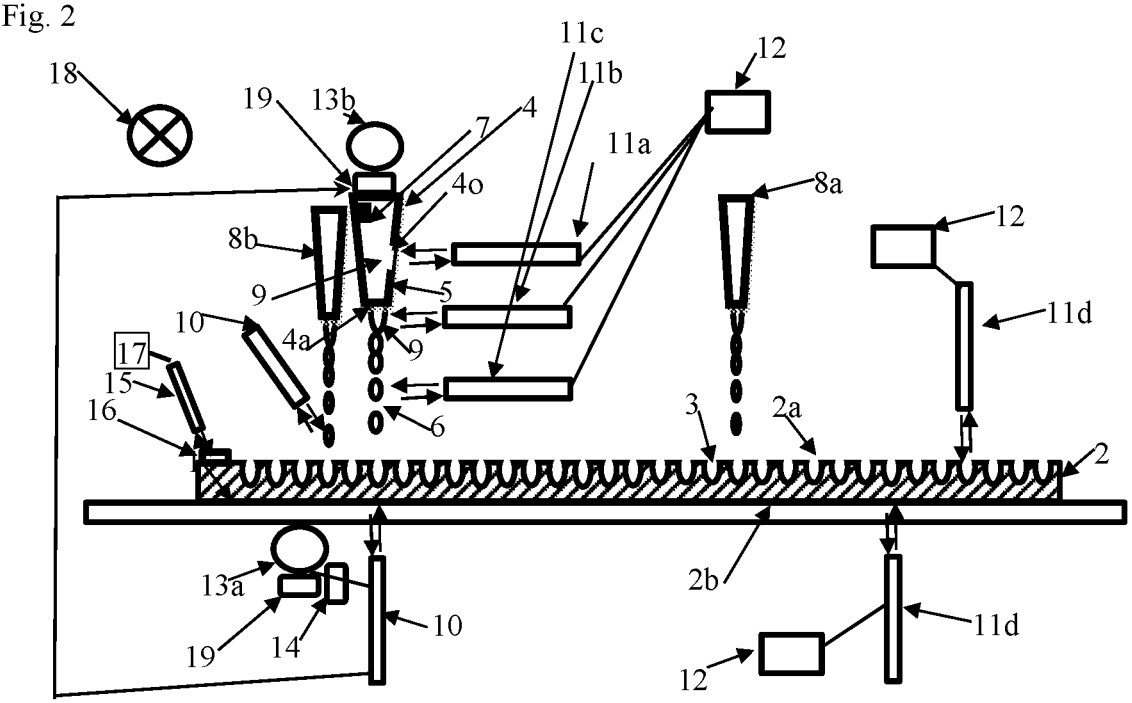

FIG. 2 shows an embodiment which additionally comprises a second droplet generator 8a and a third droplet generator 8b which are moved along the holding device 1 together with the droplet generator 4 by means of the transport device 13b, or which together are fixedly mounted with the droplet generator 4 while the holding device 1 is moved by means of the transport device 13a.

Example: Depositing Cells, Cell Clusters or Synthetic Particles Suspended in Medium into Wells of a Carrier Representative of a substance contained in a liquid, cultured animal single cells suspended as particles in culture medium were dripped onto a support 2 using a nozzle as a droplet generator 4. The suspended cells were conveyed from a reservoir container at a flow rate through a nozzle that produced droplets each having a volume of about 100 to 50 µL at a rate of about 50 Hz, while a glass plate with wells 3 was moved along below the nozzle as a carrier 2 by means of a controlled XY table that formed the transport device 13a and the holding device 1. The XY table was arranged at a distance from the nozzle opening at which the glass plate was spaced approximately 50 to 150 µm from the nozzle opening. The wells had an internal volume of approximately 200 and were arranged in a grid pattern. The XY table was controlled so that one well at a time was positioned below the nozzle when depositing a single droplet from the nozzle. The wells of the glass plate were determined with a camera as a position detector, the signal of which was used to control the XY table to position the wells.

At a concentration of one cell each in only 20% of the deposited droplets at a droplet generation rate of 50 Hz resulted in a performance of 10 Hz of individually deposited cells, the equivalent of 2500 wells having droplets, including 500 wells of singulated cells, within 50 s.

By depositing at least two droplets at this cell concentration and larger wells or at a higher cell concentration, the proportion of cells deposited singly in wells can be increased, respectively the proportion of wells without cells can be reduced.

As an example of cells, cultured plant or animal cells suspended in medium were used, or blood cells, e.g. nucleated cells isolated from whole blood. As an alternative, agglomerated cultured animal cells, so-called cell clusters, were used. As an example of bacteria, cultured *E. coli* were used. Spherical glass or plastic particles of an average size of 15 μm were used as an example of synthetic particles. The set-up of the device or set process parameters are summarized below where:

*cylindrical shape assumed for approximation:

| Parameter | exemplary particle 1 | exemplary particle 2 |
|---|---|---|
| Particle | Animal cells (e.g. immune cells), plant cells | Cell cluster |
| Droplet volume | 50 pl | 70 nl |
| Droplet rate | 50 Hz | 10 Hz |
| Movement | Carrier | Carrier |
| Nozzle | Glass capillary | Glass capillary |
| Distance nozzle well | 0.2 mm | 0.5 mm |
| Diameter well | 150 μm | 1000 μm |
| Depth well | 300 μm | 300 μm |
| Volume well (approx.)* | 5.3 nl | 235 nl |
| Position detector and transport device | Reference switch + stepper motor | Mechanical stop + servo motor |
| Particle concentration in liquid | 1000000/ml | 10000/ml |
| Number of droplets per well | 1 | 1 |
| Number of wells on carrier | 200000 | 500 |
| Proportion of wells with one cell according to Poisson distribution | approx. 5% | approx. 35% |
| Carrier material | Glass | Metal with glass bottom |
| Memory | External image processing unit | External image processing unit |
| Signal detected by the detector | Fluorescence excited photo of each droplet | Bright field photo of each drop |

| Parameter | exemplary particle 3 | exemplary particle 4 |
|---|---|---|
| Particle | Bacteria | Synthetic particles (beads) |
| Droplet volume | 50 pl | 35 pl |
| Droplet rate | 100 Hz | 1 Hz |
| Movement | Carrier | Nozzle |
| Nozzle | Glass capillary | Si Jet |
| Distance nozzle well | 0.2 mm | 5 mm |
| Diameter well | 150 μm | 500 μm |
| Depth well | 300 μm | 100 μm |
| Volume well (approx.)* | 5.3 nl | 19.6 nl |
| Position detector and transport device | Controlled linear axis with glass scale | Controlled linear axis with glass scale |
| Particle concentration in liquid | 500000/ml | 500000/ml |
| Number of droplets per well | 10 | 50 |
| Number of wells on carrier | 100000 | 500 |
| Proportion of wells with one cell according to Poisson distribution | approx. 19% | approx. 37% |
| Carrier material | Plastic with glass bottom | Silicon with glass bottom |
| Memory | Directly on the camera | External image processing unit |
| Signal detected by the detector | Particles yes/no | Bright field photo of each drop |

The droplet rate and droplet volume were generated by the frequency of a piezoelectric crystal attached to the nozzle and by means of the flow rate and of the pressure of the liquid in the nozzle used as a droplet generator.

The wells had a substantially cylindrical cross-section and were formed in a grid arrangement in a plate-like support made of glass with a size of about 127 mm×85 mm, thickness about 0.5 mm.

The proportion of wells with one cell according to Poisson distribution indicates the statistical proportion of wells with one cell of the total number of wells. The values according to Poisson distribution as given in the Table are theoretically calculated values and do not take into account effects of real experiments, e.g. sedimentation of particles before droplet settling.

The transport device was controlled in each case by the specified position detector and moved the carrier for exemplary particles 1, 2 and 3 by moving an XY table, which formed the transport device, while the glass capillary used as the droplet generator was fixed in place above the XY table, respectively the carrier. In the case of exemplary particle 4, a print head for liquids (SiJet), which is movable in a controlled manner in one plane, was used as the nozzle, while the carrier was fixed in a stationary position below it.

The detector with memory was configured to record the signals detected in the liquid region, to assign them to the respective recorded position of the transport device or carrier and to store this assignment. This assignment allowed a subsequent easy finding of wells containing the desired number, e.g. exactly one particle. Alternatively, the detector was not directed at the free droplet stream or at a continuous liquid stream in the droplet generator, but after the droplets were deposited, the detector was directed at the carrier to detect the droplets deposited in the wells.

REFERENCE SIGNS

1 Holding device
2 carrier
3 well
3a upper side
3b lower side
4 Droplet generator
4o Optically permeable wall section
5 liquid
6 free droplet stream, drop
7 Vibration generator
8a second droplet generator
8b third droplet generator
9 Liquid section
10 Position detector
11a, 11b, 11c, 11d, 11a2 Detector
12 Memory
13a, 13b Transport device
14 Control device
15 Sensor
16 Coding, reference point
17 Memory
18 Light source
19 Correction drive

The invention claimed is:

1. A device for depositing liquid droplets on a carrier, comprising
   a droplet generator arranged to generate droplets from a liquid,
   a holding device, configured for receiving a carrier,
   at least one detector arranged to detect a signal for each liquid section from which the droplet generator forms a droplet and/or to detect a signal for each droplet generated, wherein the at least one detector is connected to a memory configured to assign and store signals picked up by the at least one detector to the regions to which the droplet generator is directed, wherein the droplet generator is arranged to generate droplets independently of signals from the detector, and a transport device configured to move the holding device or the droplet generator.

2. The device according to claim 1, comprising a control device with a position detector directed towards the holding device, which position detector is configured to detect the relative position of wells of a carrier arranged on the holding device with respect to the droplet generator and to control the transport device for the relative movement of the holding device and the droplet generator in order to position the wells matchingly to the droplet generator.

3. The device according to claim 1, wherein the detector is exclusively arranged to detect a signal for droplets deposited on a carrier and to assign the signals to the regions to which the detector is directed.

4. The device according to claim 1, comprising a position detector configured to detect the relative position of the holding device to the droplet generator, and a correction drive which is controlled depending on the position detector and is configured to move the holding device or the droplet generator.

5. The device according to claim 4, characterized in that the correction drive is configured to execute a movement orthogonal to the movement of the transport device.

6. The device according to claim 4, wherein the correction drive is configured to move only one of the holding device and the droplet generator, and the transport device is configured to move only the other of the holding device and the droplet generator.

7. The device according to claim 1, comprising a position detector configured to detect wells or a coding and/or a reference point for the arrangement of wells of a carrier arranged on the holding device.

8. The device according to claim 1, wherein the control device comprises a position detector directed towards the transport device, the control device being configured to control the relative movement of the transport device relative to the droplet generator in order to position successively regions in which wells of a carrier to be arranged on the transport device are arranged in a manner matching the droplet generator.

9. The device according to claim 8, characterized in that the control device is configured to move the transport device for the relative movement of the transport device relative to the droplet generator.

10. The device according to claim 1, comprising a position detector configured to detect the position of the holding device or of a carrier arranged on the holding device, relative to the droplet generator during the duration of the movement of the transport device continuously, at an interval or at at least two temporally spaced intervals, or only at the beginning of the operation of the droplet generator and/or only at the beginning of the movement and/or at the end of the movement of the transport device.

11. The device according to claim 1, wherein the regions to which the droplet generator is directed are the surface regions of a carrier arranged on the transport device.

12. The device according to claim 1, wherein the memory is configured to assign signals picked up by the detector to surface regions of a carrier arranged on the holding device.

13. The device according to claim 11, wherein the surface regions are wells.

14. The device according to claim 1, wherein the transport device is controlled for relative movement between droplet generator and the holding device, while a carrier arranged on the holding device is arranged at a distance from the droplet generator which is equal to or smaller than the diameter of liquid emerging from the droplet generator.

15. The device according to claim 1, wherein the at least one detector is configured to detect a substance contained in drop-shaped or continuous liquid, which comprises a particle or is a particle, and to generate a signal therefor.

16. The device according to claim 1, wherein the regions are wells formed in a carrier.

17. The device according to claim 1, comprising a sensor configured for entering data for the arrangement of wells of a carrier arranged on the holding device, for detecting the arrangement of the wells or for detecting a coding of the carrier, the sensor being connected to a memory which contains an assignment of the coding to an arrangement of wells, where the transport device is controlled in dependence on an entered arrangement of wells.

18. The device according to claim 17, wherein the sensor is a microscope.

19. The device according to claim 1, wherein the droplet generator has at least one controlled piezoelectric crystal for generating drops.

20. The device according to claim 1, wherein the transport device is controlled solely in dependence on a rate of droplet generation in order to position exactly 1 well of a carrier arranged on the holding device for each individual droplet or for at least 2 droplets from the droplet generator.

21. The device according to claim 1, wherein the transport device and the droplet generator are independent of the signal from the at least one detector.

22. The device according to claim 1, wherein the at least one detector is directed to one of the regions in which a liquid section of a continuous liquid phase is present within the droplet generator or adjacent to the outlet opening of the droplet generator, or which is located at a distance from the droplet generator in which droplets are formed from a liquid, and/or which is a region in which droplets are arranged on a carrier arranged on the holding device.

23. The device according to claim 1, comprising one or more additional droplet generators arranged for depositing droplets of a second liquid into the same regions at which the droplet generator is directed.

24. The device according to claim 23, wherein the droplet generator and the one or more additional droplet generators are fixed in position and the transport device is configured to move a carrier arranged thereon.

25. The device according to claim 1, wherein the droplet generator is configured to continuously generate droplets and the transport device is controlled in dependence on the detector at each region where a carrier arranged on the transport device has a well until at least one signal for the presence of a particle is detected by the detector and the transport device is configured to align the droplet generator directly in succession with in each case directly adjacent wells of a carrier.

26. The device according to claim 1, wherein the transport device is arranged for relative movement between droplet generator and holding device at constant speed.

27. The device according to claim 1, wherein the droplet generator is configured to deposit a predetermined number of droplets into wells at a higher rate when matchingly positioned relative thereto than when positioned next to a well on the carrier.

* * * * *